July 5, 1932.  J. W. SMITH  1,866,374
CHUCK
Filed Oct. 27, 1930
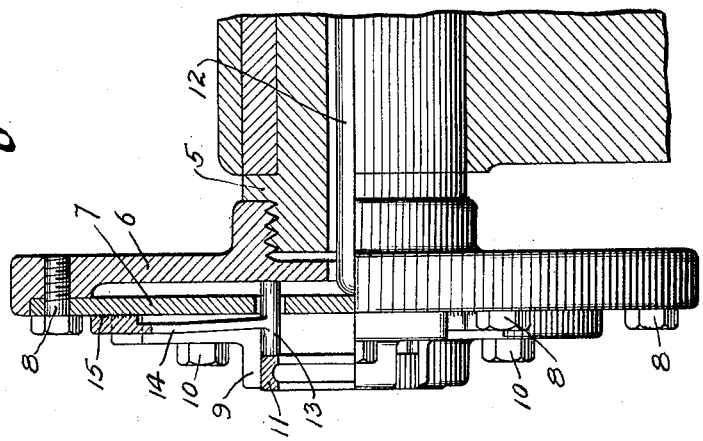
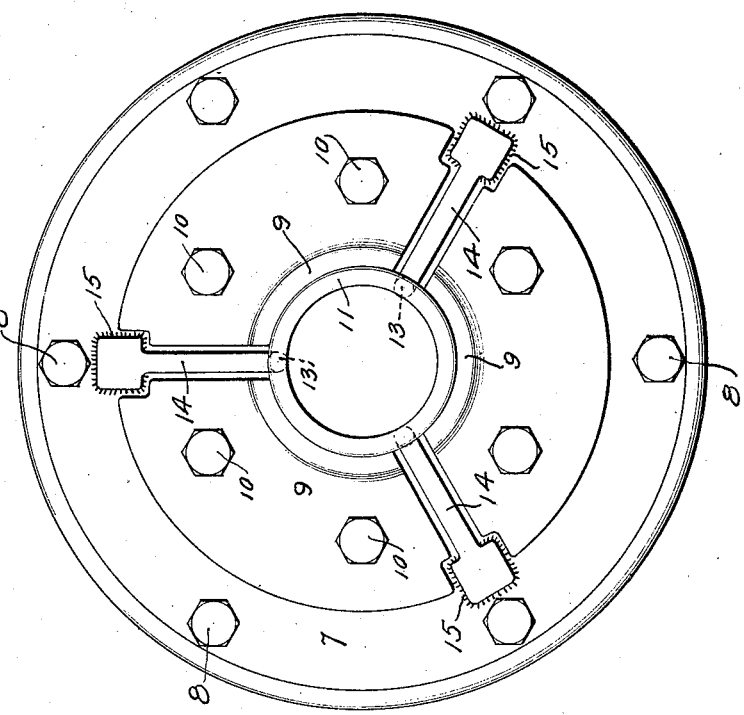
INVENTOR
John W. Smith
BY
Mitchell Bechet
ATTORNEYS Patented July 5, 1932

1,866,374

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

CHUCK

Application filed October 27, 1930. Serial No. 491,565.

My invention relates to a diaphragm chuck and more particularly to certain improvements on a chuck of the type disclosed in Scaife Patent No. 1,389,272, dated August 30, 1921.

It is the general object of the invention to provide a chuck of the character indicated with improved work stop means for definitely locating a work piece.

It is another object to provide improved work stop and ejecting means for a chuck of the character indicated.

Briefly stated, in a preferred form of the invention I employ a chuck body having a diaphragm secured thereto. The diaphragm has chuck jaws which are moved upon flexing of the diaphragm to grip and release a work piece. A work stop is located in position to be engaged by a work piece inserted into position to be gripped by the jaws so that the work stop is moved by the work piece when the latter is moved into work gripping position. The work stop may be a solid member normally out of contact with the chuck body but movable into contact therewith by the work piece. The work stop is resiliently connected preferably to a flexing portion of the diaphragm so that upon release of a work piece by the chuck jaws the work piece will be ejected.

In the drawing which shows, for illustrative purposes only, a preferred form of the invention—

Fig. 1 is a front view in elevation of a chuck illustrating features of the invention;

Fig. 2 is a side view in quarter section of the chuck shown in Fig. 1.

In said drawing, 5 indicates a spindle or other support for a face plate 6. The face plate, either alone or in conjunction with the spindle or support 5, may constitute the chuck body. A flexible diaphragm 7 is secured to the chuck body, preferably at its periphery, as by means of cap screws 8—8. On the diaphragm 7 are chuck jaws 9—9, which, in the form shown, are separately formed and secured to the diaphragm as by means of cap screws 10—10. The particular jaws illustrated are for externally gripping a work piece, such as a bearing ring 11. The diaphragm is moved in any suitable manner so as to cause the same to be flexed for moving the jaws 9—9. In the form shown, a simple push rod 12, operable by any suitable means, is disclosed. Movement of the push rod 12 toward the left flexes the diaphragm and opens the external gripping jaws 9—9 so as to permit the insertion of a work piece 11. Upon movement of the push rod 12 toward the right, the diaphragm 7 springs back to cause the jaws 9—9 to grip the piece 11.

In order to definitely locate the work piece 11 relatively to the chuck body, I provide improved work stop means which also acts to either wholly or partially eject the work piece when the chuck jaws are open. In the particular form illustrated, I employ three work stop members 13 suitably positioned so as to be engaged by a work piece 11 and which may pass freely through openings in the diaphragm and abut the chuck body. Each work stop member 13 is resiliently mounted so as to be normally out of contact with the chuck body. Each work stop member 13 may form a part of or be secured to a spring tempered arm or finger 14 secured to the diaphragm as by means of welding as indicated at 15. For a purpose which will be later described, I prefer to attach the spring arm 14 to a portion of the diaphragm which is flexed. The operation is as follows:

With the parts in the position illustrated in Fig. 2, if the push rod 12 be moved toward the left the diaphragm 7 will be flexed, and the chuck jaws 9—9 will be moved to open position. During this movement, the spring arm 14 being attached as at 15 to a flexing portion of the diaphragm will be further flexed. As soon as the jaws 9—9 release the work piece 11, the stressed spring arms 14 will cause the work stop members 13 to spring outwardly or toward the left so as to eject or tend to eject the work piece 11. During this movement, the work stop members 13 move to a position out of engagement with the chuck body. A new work piece is then inserted in the jaws and into contact with the outer ends of the work stop members 13, which latter are forced by the work piece 11 and against the stress of the spring arms 14 into contact with the chuck body. Thus, the work piece 11 is definitely located longitudinally relatively to the chuck body. Movement of the push rod 12 toward the right then permits the diaphragm 7 to spring back substantially to the position shown in Fig. 2 and grip the work piece circumferentially while the latter is definitely located by the work stop members 13 now solidly interposed between the work piece and the chuck body. After performing the desired operation on the work piece 11, the push rod 12 is again moved toward the left so as to cause the jaws to release the work piece, and the spring arms 14 will again move the work stops 13 away from the chuck body so as to eject the finished work piece, as heretofore described.

By means of my invention, I am able to definitely locate a work piece relatively to the chuck body rather than to the diaphragm which may not always go back to the same location, and in addition the work piece is ejected either wholly or partially upon its release by the jaws.

While the invention has been described in considerable detail and a preferred form illustrated, it is to be understood that various changes and modifications may be made within the scope of the invention as defined in the appended claims.

I claim:

1. In a diaphragm chuck, a chuck body, a diaphragm secured to said body, chuck jaws on said diaphragm, means for flexing said diaphragm to move said jaws, a resiliently mounted work stop and work ejector carried by a flexing part of said diaphragm, said diaphragm having an opening therein to permit the work stop to engage the chuck body, whereby upon moving a work piece into engagement with the work stop the latter will move into engagement with the chuck body and definitely locate the work piece while being held by the jaws and upon flexure of said diaphragm to move said jaws to release said work piece said flexible portion of said work stop will be additionally flexed and said work stop will spring outwardly to eject a work piece from said jaws.

2. In a diaphragm chuck, a chuck body, a diaphragm thereon, chuck jaws on said diaphragm, means for flexing said diaphragm to move said chuck jaws, a combined work stop and work ejector including a spring pressed member adapted to be moved into engagement with the chuck body by the work piece, said spring pressed work stop serving to eject a work piece from said jaws upon flexure of said diaphragm to move said jaws to release said work piece.

3. In a diaphragm chuck, a chuck body, a diaphragm thereon, chuck jaws on said diaphragm, means for flexing said diaphragm to move said chuck jaws, a work stop having a spring arm, said arm being secured to a flexing portion of said diaphragm, said work stop being normally out of contact with said chuck body and adapted to be forced into engagement with said chuck body by a work piece upon flexing of said spring arm, whereby upon release of a work piece said spring arm will cause said work stop to move in a direction to eject a work piece.

4. In a diaphragm chuck, a chuck body, a diaphragm thereon, chuck jaws on said diaphragm, means for flexing said diaphragm to move said chuck jaws, a work stop, spring means for holding said work stop normally out of contact with said chuck body and permitting said work stop to be moved into engagement with said chuck body by a work piece when moved into chuck jaw engaging position, for the purpose described.

5. In a diaphragm chuck, a chuck body, a diaphragm thereon, chuck jaws on said diaphragm, means for flexing said diaphragm to move said chuck jaws, work stop means movable relatively to said chuck body by a work piece when moved into chuck jaw engaging position, for the purpose described.

6. In a diaphragm chuck, a chuck body, a diaphragm thereon, chuck jaws on said diaphragm, means for flexing said diaphragm to move said chuck jaws, work stop means for a work piece, said work stop means being movable to a definite position by a work piece when moved into chuck jaw engaging position for definitely locating said work piece relatively to said chuck body.

JOHN W. SMITH.